Dec. 6, 1960 P. SCHENK ET AL 2,963,312
RACK FOR MOUNTING STORES ON AIRCRAFT
Filed April 11, 1957
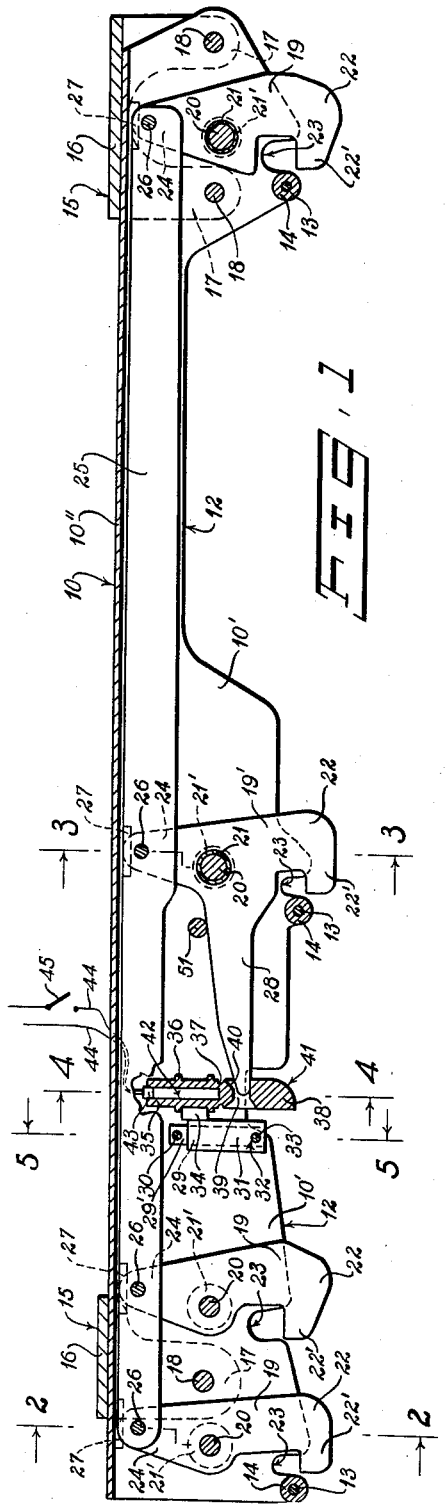
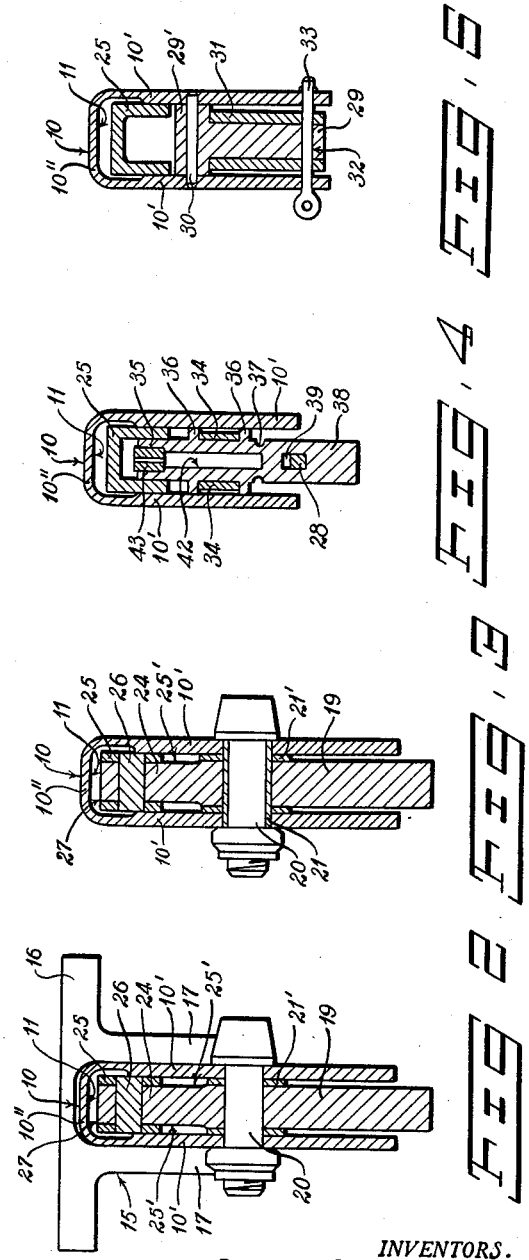
INVENTORS.
Peter Schenk and
BY Frank R. Wulffaert
John J. Sullivan
ATTORNEY.

2,963,312
RACK FOR MOUNTING STORES ON AIRCRAFT

Peter Schenk, Centerport, and Frank R. Wulffaert, Hicksville, N.Y., assignors to Republic Aviation Corporation, Farmingdale, N.Y., a corporation of Delaware Filed Apr. 11, 1957, Ser. No. 652,229

9 Claims. (Cl. 294—83)

This invention relates to mounting and supporting racks for stores carried by airplanes and particularly to a single rack adapted to be mounted on an airplane capable of receiving stores of various types and sizes and including means for releasing and jettisoning the store from the rack.

Among other things the present invention contemplates a rack to releasably connect and support any one of a variety of stores, e.g., tanks, bombs, etc., to an airplane to the end that the rack may be permanently installed in or on the airplane rather than be removed and replaced by other racks each corresponding to a particular store or stores.

Moreover, the present rack is designed to engage and secure the connected store at multiple points in its length to support and hold it immovably mounted on and to the airplane. The release mechanism is such that its operation simultaneously disengages the store from the rack at every point of connection to the rack.

At the same time the simplicity of the instant rack compared to existing racks lends itself to a greater degree of reliability as well as an increase in strength to weight ratio which is especially desirable in aircraft of the sonic and supersonic class.

With the above and other objects in view, as will be apparent, this invention consists in the construction, combination and arrangement of parts all as hereinafter more fully described, claimed and illustrated in the accompanying drawings, wherein:

Fig. 1 is a longitudinal section through the present mounting and supporting rack to show the multiple connectors embodied in the rack for cooperation with complementary supporting members carried by the store and the means by which all of the connectors are actuated in unison for the simultaneous release of such supporting members;

Fig. 2 is a transverse section taken along line 2—2 of Fig. 1;

Fig. 3 is a section taken along line 3—3 of Fig. 1;

Fig. 4 is a section taken along line 4—4 of Fig. 1; and,

Fig. 5 is a section taken along line 5—5 of Fig. 1.

While the present rack is designed and adapted for general application in the releasable connection of stores to aircraft, it has particular utility in military airplanes of the fighter and interceptor class. Fighter airplanes, for example, are presently being designed and built for tactical operation at supersonic and sonic speeds carrying external stores or pay-loads such as bombs, tanks, etc. These pay-loads vary with the particular mission and such airplanes realize maximum operating efficiency at high altitude, to wit, forty thousand feet and higher.

Many types of mounting and supporting racks have been employed to satisfy all of the store requirements of a particular airplane but no single rack heretofore has been capable of fulfilling the composite requirements of the several racks. Thus, each airplane, has required a series of removable and interchangeable racks, any one of which may be installed on the airplane to accommodate the store for a given mission.

In addition, release of the connected store by and from its rack must be complete and instantaneous to the end that its full ejection therefrom can be effected. At sonic and supersonic speeds and at high altitude, greater precision is required in the release and ejection operation lest the proximity of the store to the airplane damage the airplane structure.

Prior release mechanisms, and particularly those wherein multiple points of connection between store and rack are involved, include complex operating mechanisms and initiating systems in order to accomplish the desired result. These prior devices are prone to fail largely due to their complexity, i.e., the number of moving parts and the coordination or required precision in movement of these parts. Thus, under normal operating conditions of the airplane it has been difficult to maintain these prior mechanisms in proper adjustment, adequately lubricated and free from ice formation or the like.

The present invention proposes to solve the foregoing as well as other problems involved in the mounting of stores on aircraft and the release thereof for ejection from the aircraft during flight. Moreover, the instant invention proposes a more reliable rack wherein the release and ejection of the store is approximately simultaneous and not in a pronounced sequence as in the prior devices.

More specifically, this invention contemplates a single rack adapted to receive, connect and secure to the airplane the mounting members carried by all stores which the airplane is intended to carry. This rack includes an explosive actuating mechanism which assures the complete release of the connected store from the rack regardless of the operating conditions of the airplane, i.e., speed and/or altitude or conditions due to improper or inadequate servicing and maintenance.

Referring more particularly to the drawings, 10 designates a housing in which the present mounting and supporting means and its release actuating mechanism is disposed. This housing 10 is a channel or U-shaped in section establishing a longitudinal groove or space 11 centrally between the sides 10' of the housing 10. These sides 10' are carried by the base 10" and are disposed parallel one to the other and generally at right angles to the base 10" of the housing 10.

The outer edges of the sides 10' of the housing 10 may be cut back, as at 12, where necessary to accommodate associated structure and/or mechanisms without appreciably weakening the housing structurally. A number of bolts 13 pierces the sides 10' of the housing 10 adjacent their outer edges for the interconnection thereof one to the other. A spacer or sleeve 14 equal in length to the space between the sides 10' of the housing 10 is mounted on the shank of each bolt 13 with its ends abutting the adjacent inner faces of the sides 10'. These sleeves 14 thus serve to limit the tightening of the bolts 13 to thereby maintain the sides 10' in substantially parallel relative positions and augment the structural integrity of the housing 10.

A suitable number of brackets 15 or equivalent elements is employed for immovably mounting the housing 10 to fixed structure of the airplane such as the wing. Each of these brackets 15 comprises a base plate 16 having one or more pairs of aligned and spaced ears 17 projecting at right angles therefrom. Each bracket 15 is adapted to receive the housing 10 between its ears 17 with the outer surfaces of sides 10' and the base 10" of the housing in abutment with the inner surfaces of the ears 17 and base plate 16. Bolts 18 pierce each pair of ears 17 of the brackets 15 as well as the opposed sides 10′ of the housing 10 to thereby fixedly secure the housing 10 to each bracket 15. Any suitable means may be employed to mount or anchor the several brackets 15 to the airplane.

A plurality of levers 19, one of which, 19′ is a bellcrank lever, is disposed within the channel or space 11 of the housing 10 to lie in common plane longitudinally of the housing, one with the other. These levers 19—19′ are spaced one from the other along the housing 10 and are pivotally mounted medially of their lengths on bolts 20 which pierce the sides 10′ of the housing 10. A sleeve or bushing 21 equal in length to the overall width of the housing 10 may be employed as a bearing on some or all of the pivot bolts 20 and a spacer 21′ is disposed around each bolt 20 between the ends of the hubs of the levers 19—19′ and the adjacent sides 10′ of the housing 10. These levers 19—19′ are organized to function in pairs in supporting a store and the levers 19 of each pair are located with reference to each other to correspond to the spacing of the mounting members (not shown) carried by a particular store.

Each lever 19 may vary in size depending upon the mass of the particular store to be carried by it but is otherwise identical in operation and function to the other levers. At its outer end, each lever 19—19′ terminates in a hook 22, all of said hooks facing or opening in the same direction and extending outwardly of the housing 10 whereby the outer edge of each hook lies substantially in the plane of the edges of the sides 10′ of the housing 10. The edges of the sides 10′ of the housing 10 adjacent each hook 22 are recessed or notched, as at 23 for the reception of a mounting member or eye (not shown) carried by the store and the associated hook 22 is thus adapted to coact with the recess to lock the mounting member therein and support the weight of the store. The relative shape and area of each recess 23, therefore, is determined by the size of the mounting member or eye on the store. It will be noted that the engaging space of each hook 22 substantially registers with the associated notch 23 when in engaging position as shown in Fig. 1. Thus, the toe 22′ of the hook 22 is adapted to enter the mounting member or eye on the store which is also received in part in the notch 23. This engagement between the mounting member or eye on the store and the notch 23 retains the mounting as and when the toe 22′ is withdrawn.

At its other or inner end 24 each lever 19 is connected by a pivot pin 26 to a transfer link 25 situated within and extending the full length of the housing 10. These ends 24 of the levers 19—19′ are substantially identical one with the other whereby the axes of their pivot pins 26 are disposed the same distance above the axes of their respective pivot pins or bolts 20. Thus, the several levers move or swing in unison on and about their respective pivots or bolts 20 if and when the transfer link 25 is reciprocated in the housing 10.

The transfer link 25 is a channel bar (see Fig. 5) with its sides adapted to overlie the ends 24 of the levers 19—19′ and the bar or link 25 is substantially equal in overall thickness to the space defined by the sides 10′ of the housing 10. The ends 24 of the levers 19—19′ are reduced in thickness, as at 25′ to increase the space available for the sides of the channel bar 25 between the levers and the sides 10′ of the housing 10. The base of the channel bar 25 may be provided with the slots 27 in the areas of the terminals of the ends 24 of the levers 19—19′ to insure the unrestricted relative movement thereof with no appreciable loss of its structural rigidity.

The bellcrank lever 19′ located near the center of the length of the link 25, is formed or otherwise provided with an actuating arm 28 which projects laterally in the same direction as the hooks 22 and is approximately in alignment with pivot pin or bolt 20 of the lever 19′. The actuating arm 28 is thus disposed centrally between the sides 10′ of the housing 10 to normally rest substantially parallel to and below the transfer link 25. The length of the arm 28 is greater than that of the hooks 22 so that it describes a larger arc in its rotation about its pivot pin or bolt 20 than do the hooks in their oscillation.

Mounted between the sides 10′ of the housing 10 and disposed adjacent the outer end of the lever 28 is a mounting for the actuating mechanism or device acting on the arm 28 of the lever 19′. This mounting comprises a rod 29 having a bearing 29′ at one end which is pivotally secured between the walls 10′ adjoining the base 10″ of the housing 10 by a pin 30. The free end of the rod 29 is disposed in spaced relation to the sides 10′ of the housing 10 and when free is adapted to swing on this pin 30. A sleeve 31 is mounted for reciprocation on the rod 29 below the bearing 29′. Apertures 32 pierce the rod 29 adjacent its outer end, the sleeve 31 and the sides 10′ of the housing 10 which are adapted to register to receive a pin 33 that secures the rod 29 and sleeve 31 to the housing 10 in a fixed position.

Adjoining the bearing 29′ the end portion of the sleeve 31 is provided with a pair of fixed lugs 34 projecting laterally toward the lever 28. The space between or defined by the lugs 34 is substantially equal to the transverse dimension of a cartridge or squib 35 to the end that the squib may be snugly received therein and be held by the sleeve 31. Outstanding integral flanges or collars 36 on the squib or cartridge 35 abut the opposite edges of each lug 34 to support the cartridge or squib against movement relative to sleeve 31.

At its outer end the cartridge 35 is formed with a reduced neck 37 and beyond this neck terminates in a lobe 38. A transverse aperture 39 in the lobe 38 receives and supports the extremity of the actuating arm 28 of the bellcrank lever 19′. The edges of this aperture 39 may be beveled or rounded as at 40 to facilitate the reception of the end of the arm 28 therein and the edge 41 of the lobe 38 adjacent the lever 28 is rounded or beveled in the direction away from the lever 28.

Within the shell 35 of the cartridge or squib is a cavity 42 extending from one end thereof to approximately the neck 37. An explosive charge fills this cavity 42 which is closed at one end by a cap 43 fixedly secured to the shell in any suitable manner. The cap 43 is perforated for the passage of the wires 44 that supply the current for firing the charge when the normally open switch 45 located in the cockpit is closed.

From the foregoing description of the present rack, its operation will be readily understood. When a store is mounted on the rack with its mounting members engaged by the hooks 22 and the notches 23 the several components of the rack will be situated as shown in Fig. 1. Upon closing the switch 45, the charge in the cartridge 35 is fired and the expanding gases thus created fracture the cartridge 35 in the area of the neck 37 separating and freeing the lobe 38 to be forcibly propelled from the rack. The force of the explosion of the cartridge 35 and discharge of the lobe 38 is exerted directly on the extremity of the actuating arm 28 engaged in the lobe 38 to rotate it and the connected bellcrank 19′ in a counter-clockwise direction (Fig. 1) about its pivot 20. This rotation of the bellcrank 19′ reciprocates the transfer link 25 and simultaneously and concurrently rotates all of the levers 19 counter-clockwise. Thus, the hooks 22 at the outer end of the bellcranks 19 are moved in unison away from their respective notches 23 and out of engagement with the mounting members of the store for the complete and simultaneous release of said mounts from the rack.

To reload the rack with a new cartridge and to mount another store is accomplished by first removing the expended cartridge 35. To this end, the pin 33 of the mounting is withdrawn to disconnect the sleeve 31 from the rod 29 and free the latter for swinging movement on pivot pin 30. The sleeve 31 and the attached expended cartridge 35 may now be removed from the mount, wires 44 extending from the end of the cartridge having first been disconnected from the switch 45. The expended cartridge 35 is withdrawn from the lugs 34 carried by the sleeve 31 and a fresh cartridge 35 is inserted. With the new cartridge 35 in place, sleeve 31 is replaced on the rod 29 and wires 44 are operatively connected to the switch 45.

The new store to be connected to and supported by the rack is then brought into position with its mounting members or eyes directed toward the corresponding notches 23 in the rack. When the mounting members or eyes of the store are seated in the notches 23 of the sides 10' of the housing 10, the hooks 22 of the levers 19 and bellcrank lever 19' may be swung clockwise to engage such mounting member to maintain the store immovably secured to the rack.

To swing the hooks 22 clockwise in unison the actuating arm 28 is then raised and rotated clockwise about its pivot 20 imparting the same movement to the levers 19 by and through the reciprocation of the transfer link 25. When the outer extremity of the arm 28 contacts the lobe 38 at the outer end of the cartridge 35, its continued movement swings the cartridge 35 and its mount away from the lever 28 on and about its pivot 30. During this movement, the end of the lever 28 slides along the surface 41 of the lobe 38 until it aligns with the aperture 39 of the lobe. The cartridge 35 and its mount may then be rotated on the pivot 30 in the direction of the lever 28 whereby the end of said lever is inserted in the aperture 39 (Fig. 1) whereupon the pin 33 may be inserted in the aligned openings 32 in the sides 10' of the housing 10, the sleeve 31 and rod 29.

If desired a stop 51 may be provided to arrest rotation of the lever 28 inwardly of the housing 10 and properly align the end of the lever 28 for reception in opening 39 in the outer end or lobe 38 of the cartridge 35.

Usually the store is engaged and supported by two of the hooks 22, the spacing of the hooks longitudinally of the housing 10 determining which two hooks agree with the spacing of the mounting members or eyes of the store and therefore are employed to support the store. However, it is manifest that all of the hooks may be used if the same number of mounting members or eyes similarly spaced are provided on the store. In any event the bellcrank lever 19' and its coacting parts is always used in releasing and ejecting the store and in mounting the store on the rack.

What is claimed is:

1. A rack for mounting stores on an aircraft comprising a series of pivotally mounted engaging elements each positioned a different distance from another corresponding to the distance between the mounting members of different size stores for operation in pairs to engage and support any one of said stores at a time, means for moving said elements in unison about their pivots from the store-engaging and supporting position aforesaid to a position releasing said store, an arm integrally formed on and projecting from one of said engaging elements, and a stationary receiver carried by the rack and disposed in the path of rotation of said arm to receive and engage it whereby the elements are secured against movement when engaging and supporting the store, said receiver housing an explosive charge and detonating means therefor for fracturing the receiver and acting on and against the actuating arm to thereby force it and the several element to their store-releasing position.

2. A rack for releasably mounting stores on an aircraft comprising a housing, a plurality of levers pivotally mounted medially of their lengths in said housing each having a store-engaging member at one end projecting from the housing, actuating means interconnecting the opposite ends of said levers for pivotal movement thereof in unison relative to the housing, an operating arm carried by one of said levers and projecting laterally therefrom to swing said lever about its pivot from a store-supporting to a store-releasing position, a lock engaging and securing said operating arm against movement when disposed in the store-supporting position, explosive means connected to said lock and disposed adjacent said operating arm, and means for firing said explosive means whereby the lock is released and the operating arm is driven by the explosive means when fired to swing said levers in unison on their respective pivots to the store-releasing position.

3. A rack for releasably mounting a store on an aircraft comprising a housing adapted to be secured to the aircraft and having an opening along the side thereof disposed outwardly of the aircraft, a plurality of interconnected levers mounted in the housing for rotation in unison relative thereto and each having an engaging element at its outer end normally projecting through and from the open side of the housing whereby all of said engaging elements are moved from store-supporting to store-releasing positions, a stationary lock complemental to and disposed in the path of one of said levers to receive and secure it against movement whereby all of the engaging elements are disposed in the store-supporting position, and power-actuating means for the release of said lock and operative on and against said one lever for the spontaneous ejection of all of the levers out of the store-supporting position to the store-releasing position aforesaid.

4. A rack for mounting and supporting a store on an aircraft comprising a channeled housing adapted to be secured to an aircraft, said housing opening outwardly of the aircraft, a series of coacting pairs of engaging elements mounted in and projecting from the housing, each of said pairs corresponding and complemental to attachment means carried by a different store and each being mounted for movement to and from extreme positions supporting and releasing said store, a link interconnecting all said elements for movement in unison, a stationary lock secured to the housing adjacent and normally engaging one of the elements when disposed in the supporting position to thereby prevent movement of all of said engaging elements, said lock containing an internal explosive charge operable to disconnect the lock and forcibly eject the engaged element to the store-releasing position, and means for firing said explosive charge.

5. A rack for releasably mounting a store on an aircraft comprising an oblong housing having an opening in one of its longitudinal sides, a plurality of levers each pivotally mounted medially of its length between transverse sides of the housing, an engaging hook at the outer end of each lever projecting through the open side of the housing, said levers being substantially equal in length and disposed in a common plane whereby the hooks of at least two thereof coact with and engage mounting members on a store, a link extending longitudinally of the housing and pivotally connected to the inner end of each lever whereby said levers swing in unison on their several pivots to move said hooks to and from positions engaging and releasing the mounting members of a store, an actuating arm fixedly attached to one of said levers to project laterally therefrom, a rod between and pivotally connected to the sides of the housing adjoining the extremity of the actuating arm, a sleeve slidably mounted on said rod having a pair of spaced outstanding lugs, removable means for securing said sleeve and rod to the sides of the housing, a hollow shell with an explosive charge therein and having a pair of spaced outwardly projecting flanges one located at each end of and in contact with said lugs, a lobe at the outer end of the shell separated from the shell by a reduced neck and having an aperture therein for the reception of the extremity of the actuating arm with the attached lever in the engaging position aforesaid, and means for firing the explosive charge whereby said neck is fractured and said actuating arm and lever are moved from the store-engaging to the store-releasing position.

6. A rack for releasably mounting stores on an aircraft comprising a housing open at and along one of its sides, a plurality of levers, each pivotally mounted medially of its length between the sides of the housing defining the open side aforesaid, a hook at the outer end of each lever projecting through the open side of the housing, said levers being substantially equal in length and disposed in line at a distance one from another corresponding to the distance between mounting members on a store whereby the hooks of a pair of said levers engage and support different stores, open notches being provided in the edges of said defining sides in approximate alignment with each hook when in the store-engaging position whereby each notch receives at least a portion of a mounting member of a store and combines with the coacting hook to immovably secure said mounting member, a link pivotally connected to the inner end of each lever whereby said levers swing in unison on their respective pivots to move said hooks from the store-engaging position to a store-releasing position, an actuating arm fixedly attached to one of said levers and projecting laterally therefrom, a rod pivoted to the housing and disposed between said defining sides adjoining the extremity of the actuating arm, a sleeve slidably mounted on said rod having a pair of spaced outstanding lugs, a hollow shell with an explosive charge therein having a pair of spaced outwardly projecting flanges, one located above and the other below and each in contact with the edges of said lugs, a lobe at the outer end of the shell separated from the shell by a reduced neck and having an aperture therein for the reception of the extremity of the actuating arm when the levers are in the store-engaging position, releasable means for securing said sleeve and rod to the sides of the housing, and means for firing the explosive charge in the shell to thereby fracture the neck releasing the actuating arm and move the levers to the store-releasing position.

7. A rack for releasably mounting a store on an aircraft comprising a housing adapted to be secured to the aircraft, multiple levers each pivotally mounted within the housing and terminating at one end in a hook normally disposed outwardly of said housing for engagement and support of a store, means connecting said levers one to the other whereby all said levers move in unison on their respective pivots inwardly of the housing for release of the store, an arm projecting laterally from one of the levers, a fixed retainer mounted on the housing and disposed in the path of rotation of said arm to receive and secure it whereby the levers are held against movement relative to the housing when disposed in the store-engaging and supporting position aforesaid, and a power device operative on and against said retainer to fracture it thereby releasing and simultaneously driving said arm inwardly of the housing for the release of the store by said hooks.

8. A stores-mounting and supporting rack for aircraft comprising a plurality of levers disposed in spaced pairs, each pair corresonding in position to complementary mounting members on a different store, a store-engaging element on each lever, means interconnecting all of said levers for movement in unison relative to the aircraft to and from positions engaging and releasing a store by each pair of said elements, an arm fixedly secured to and projecting laterally from one of the levers, an expendable and replaceable retainer housing and explosive charge and fixedly secured to structure carried by the aircraft adjacent said arm, means carried by said retainer complemental to said arm to receive and secure it against movement when the levers are disposed in the store-engaging position, and an igniter to detonate said charge to thereby fracture the retainer for the release of said arm, the force of said detonation being directed on and against the arm for ejection of all of said levers from the store-engaging to the store-releasing position.

9. A stores mounting and supporting rack for aircraft comprising multiple store-engaging elements each disposed a distance from another corresponding to the distance between complementary mounting members of a different store whereby stores of different sizes may be connected thereto, said elements being mounted for movement in unison to and from store-supporting and store-releasing positions, stationary retaining means connected to one of said elements to secure it against movement when said elemetns are disposed in the store-supporting position, said retaining means including an expendable and replaceable explosive cartridge having a reduced neck and terminating in an element-engaging lobe, and ignition means for detonating said cartridge to thereby shear said neck and act on and against the connected element to eject it and the other elements from the store-supporting to the store-releasing position.

References Cited in the file of this patent

UNITED STATES PATENTS

| | | |
|---|---|---|
| 1,725,473 | Page | Aug. 20, 1929 |
| 2,206,777 | Kee | July 2, 1940 |
| 2,473,597 | Leland | June 21, 1949 |
| 2,491,400 | Thumim | Dec. 13, 1949 |
| 2,571,381 | Potter | Oct. 16, 1951 |
| 2,616,748 | Hight | Nov. 4, 1952 |
| 2,756,091 | Komarska | July 24, 1956 |